(12) United States Patent
Jeong (10) Patent No.: US 11,144,094 B2
(45) Date of Patent: Oct. 12, 2021

(54) DISPLAY DEVICE

(71) Applicant: SAMSUNG DISPLAY CO., LTD., Yongin-si (KR)

(72) Inventor: Young-Cheol Jeong, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 29 days.

(21) Appl. No.: 16/730,357

(22) Filed: Dec. 30, 2019

(65) Prior Publication Data

US 2020/0209926 A1 Jul. 2, 2020

(30) Foreign Application Priority Data

Dec. 31, 2018 (KR) .......................... 10-2018-0173829

(51) Int. Cl.
| | | |
|---|---|---|
| *G06F 1/00* | (2006.01) | |
| *G06F 1/16* | (2006.01) | |
| *G09F 9/30* | (2006.01) | |
| *G06F 1/18* | (2006.01) | |

(52) U.S. Cl.
CPC ............ *G06F 1/1652* (2013.01); *G06F 1/189* (2013.01); *G09F 9/301* (2013.01)

(58) Field of Classification Search
CPC ......... G06F 1/1652; G06F 1/189; G09F 9/301
See application file for complete search history.

(56) References Cited

U.S. PATENT DOCUMENTS

| | | | |
|---|---|---|---|
| 9,142,796 B2* | 9/2015 | Shin ...................... | H01L 51/524 |
| 9,329,447 B2 | 5/2016 | Jung et al. | |
| 9,693,460 B2* | 6/2017 | Fujimori .................. | H05K 1/18 |
| 9,933,644 B2 | 4/2018 | Kim et al. | |
| 2016/0377905 A1* | 12/2016 | Choi ..................... | G02F 1/1339 |
| | | | 257/72 |

FOREIGN PATENT DOCUMENTS

| | | |
|---|---|---|
| KR | 10-1999-0076291 | 10/1999 |
| KR | 10-2011-0110549 | 10/2011 |
| KR | 10-2018-0061483 | 6/2018 |

\* cited by examiner

*Primary Examiner* — Pete T Lee
(74) *Attorney, Agent, or Firm* — F. Chau & Associates, LLC (57) ABSTRACT

A display device includes a lower substrate that includes a side surface having a first inclined surface. An upper substrate is disposed on the lower substrate and includes a side surface having a second inclined surface. A first electrode is disposed on a surface of at least one of the lower substrate or the upper substrate. An auxiliary electrode is disposed on the first inclined surface of the lower substrate and the second inclined surface of the upper substrate. The auxiliary electrode includes a first portion corresponding to the first inclined surface, a second portion corresponding to the second inclined surface, and a bent portion bent at a predetermined angle with respect to the first and second inclined surfaces. The first electrode may be in contact with the bent portion on the first exposed surface to electrically connect to the auxiliary electrode.

8 Claims, 9 Drawing Sheets

DISPLAY DEVICE

CROSS-REFERENCE TO RELATED APPLICATION

This application claims priority under 35 U.S.C. § 119 to Korean Patent Application No. 10-2018-0173829, filed on Dec. 31, 2018 in the Korean Intellectual Property Office, the disclosure of which is incorporated by reference in its entirety herein.

1. Technical Field

The present disclosure relates to a display device, and more particularly, to a display device including a substrate having an inclined side surface and a flexible printed circuit board connected to the substrate.

2. Discussion of Related Art

Various display devices such as a liquid crystal display (LCD), an organic light emitting diode display (OLED), and the like include a display panel on which a plurality of pixels capable of displaying an image are formed. The display panel may also include a driving circuit portion capable of driving the display panel.

The display panel includes a display area in which a plurality of pixels is formed. A bezel area, which is a peripheral area in which an image cannot be displayed, may be disposed around the display area. Various driving circuits and wires may be disposed in the bezel area.

Recently, research and development have been actively performed on a technique of bonding a driving integrated circuit (IC), other printed circuits, wires, and the like to a side surface of the display panel in order to reduce the bezel area which is a non-display area.

SUMMARY

In accordance with an exemplary embodiment of the present inventive concepts a display device includes a lower substrate that includes a side surface having a first inclined surface. An upper substrate is disposed on the lower substrate. The upper substrate includes a side surface having a second inclined surface. A first electrode is disposed on a surface of at least one of the lower substrate or the upper substrate. An auxiliary electrode is disposed on the first inclined surface of the lower substrate and the second inclined surface of the upper substrate. The auxiliary electrode includes a first portion corresponding to the first inclined surface, a second portion corresponding to the second inclined surface, and a bent portion that is bent at a predetermined angle with respect to the first and second inclined surfaces. The first electrode is in contact with the bent portion of the auxiliary electrode on a first exposed surface of the first electrode to electrically connect the first electrode to the auxiliary electrode.

In accordance with an exemplary embodiment of the present inventive concepts, a display device includes a lower substrate having a first side surface. An upper substrate is disposed on the lower substrate. The upper substrate has a second side surface. A first electrode is disposed on a surface of one of the lower substrate and the upper substrate. An auxiliary electrode is disposed on the first side surface of the lower substrate and the second side surface of the upper substrate. At least one of the first side surface of the lower substrate or the second side surface of the upper substrate has an inclined surface. The auxiliary electrode includes a bent portion bent at a predetermined angle with respect to the inclined surface. The first electrode is in contact with the bent portion of the auxiliary electrode on a first exposed surface of the first electrode to electrically connect the first electrode to the auxiliary electrode. The first exposed surface is adjacent to the inclined surface.

In accordance with an exemplary embodiment of the present inventive concepts, a display device includes a first substrate that includes a first side surface. A second substrate is disposed on the first substrate. The second substrate includes a second side surface. At least one of the first side surface and second side surface have a inclined surface. A first electrode is disposed on a main surface of at least one of the first substrate or the second substrate. A second electrode is disposed on the first side surface and the second side surface. The second electrode includes a first portion corresponding to the first side surface, a second portion corresponding to the second side surface, and a bent portion that is bent with respect to at least one of the first and second side surfaces. The first electrode is in contact with the bent portion of the second electrode on an end portion of the first electrode to electrically connect the first electrode to the second electrode.

Exemplary embodiments of the present inventive concepts provide a display device in which upper and lower substrates may be provided with inclined side surfaces. A flexible printed circuit board on which an auxiliary electrode, a circuit, and the like are formed may be bonded to the inclined side surfaces, thereby improving the bonding force between the substrate and the auxiliary electrode on the flexible printed circuit board. A sealing portion may be disposed to expose an electrode on the substrate, thereby increasing a contact area between the electrode on the substrate and the auxiliary electrode to stably apply a power supply, a signal, and the like.

DETAILED DESCRIPTION OF THE EMBODIMENTS

The present invention will be described more fully hereinafter with reference to the accompanying drawings, in which exemplary embodiments of the present inventive concepts are shown. As those skilled in the art would realize, the described embodiments may be modified in various different ways, all without departing from the spirit or scope of the present disclosure.

Parts that are irrelevant to the description will be omitted to clearly describe the present disclosure, and like reference numerals designate like elements throughout the specification.

Further, in the drawings, the size and thickness of each element are arbitrarily illustrated for ease of description, and the present disclosure is not necessarily limited to those illustrated in the drawings. In the drawings, the thicknesses of layers, films, panels, regions, etc., may be exaggerated for clarity. In the drawings, for ease of description, the thicknesses of some layers and areas may be exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means disposed on or below the object portion, and does not necessarily mean disposed on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "on a plane" means viewing a target portion from the top, and the phrase "on a cross-section" means viewing a cross-section formed by vertically cutting a target portion from the side.

Figure 1:
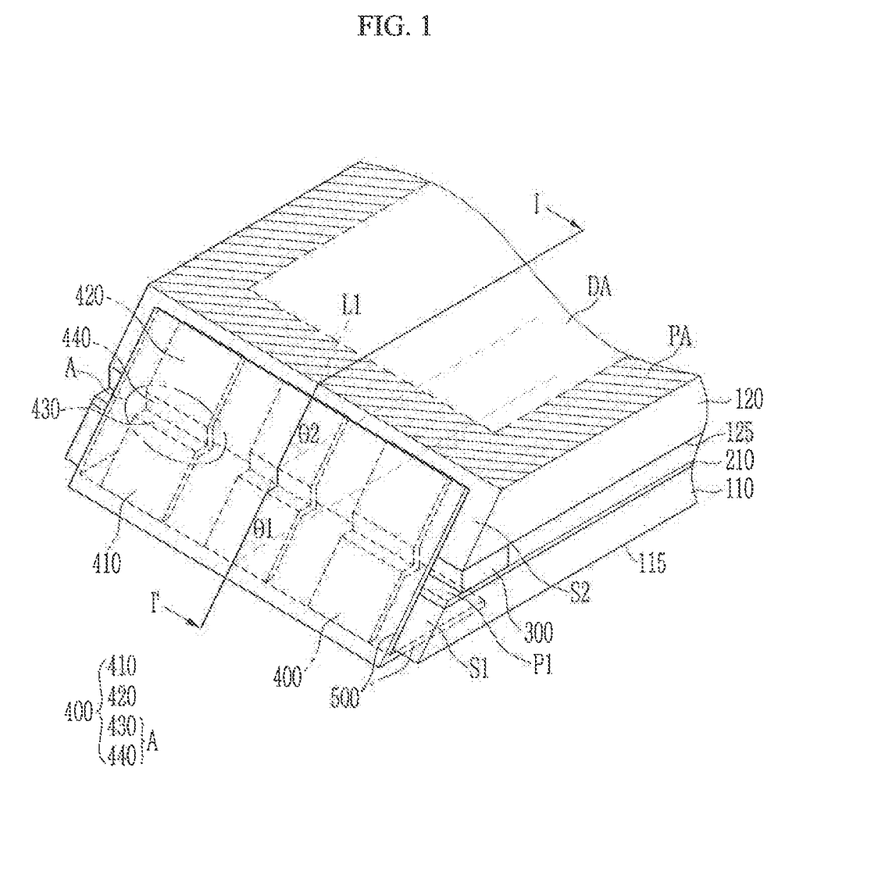
FIG. 1 illustrates a perspective view of a display device according to an exemplary embodiment of the present inventive concepts.

Hereinafter, a display device according to an exemplary embodiment of the present inventive concepts will be described with reference to FIG. 1. FIG. 1 illustrates a perspective view of a display device according to an exemplary embodiment of the present inventive concepts. Certain invisible constituent elements are shown in dashed lines.

Referring to FIG. 1, a display device according to an exemplary embodiment of the present inventive concepts includes a flexible printed circuit (FPC) 500, a lower substrate 110, an upper substrate 120, a first electrode 210, a sealing portion 300, and an auxiliary electrode 400.

In an exemplary embodiment, the lower substrate 110 and the upper substrate 120 may be formed of a rigid material such as glass or a flexible organic material such as plastic. When the lower substrate 110 and the upper substrate 120 are flexible, they may include various plastics such as polyethylene terephthalate (PET), polyethylene naphthalate (PEN), polycarbonate (PC), polyarylate (PAR), polyether- imide (PEI), polyether sulfone, (PES), or polyimide (PI), a metal thin film, an ultra-thin glass, or the like.

The lower substrate 110 may have a first inclined surface S1 that is inclined at a predetermined angle. The first inclined surface S1 may be provided on a side surface of the lower substrate 110. The upper substrate 120 may have a second inclined surface S2 that is inclined at a predetermined angle. The second inclined surface S2 may be provided on a side surface of the upper substrate 120. The lower substrate 110 and the upper substrate 120 may have a structure (e.g., a level of workability) that facilitates formation of the first inclined surface S1.

Figure 2:
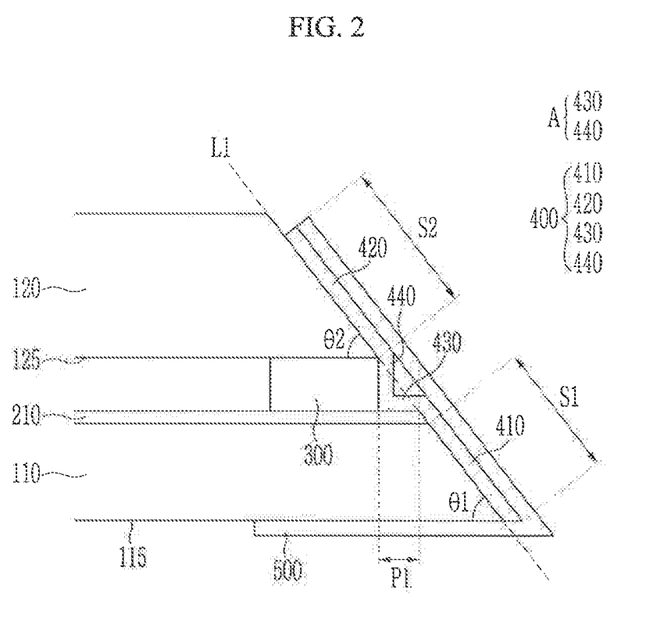
FIG. 2 illustrates a cross-sectional view taken along line I-I' shown in FIG. 1 according to an exemplary embodiment of the present inventive concepts.

The first inclined surface S1 and the second inclined surface S2 are inclined at a predetermined angle with respect to a bottom surface (hereinafter referred to as a lower surface) at which the lower substrate 110 is disposed. As shown in FIGS. 1-2, the inclined angle formed by the first inclined surface S1 and the lower surface 115 of the lower substrate 110 is referred to as the first inclined angle $\theta 1$. As shown in FIGS. 1-2, the inclined angle formed by the second inclined surface S2 and the lower surface 125 of the upper substrate 120 is referred to as the second inclined angle $\theta 2$. In FIG. 1, it is illustrated that the first inclined angle $\theta 1$ and the second inclined angle $\theta 2$ are the same. Accordingly, a first straight line L1 shown in FIG. 1 may be disposed on a single plane. Therefore, when the first inclined surface S1 and the second inclined surface S2 are extended, they may be disposed on one plane.

However, in some exemplary embodiments, the first inclined angle $\theta 1$ and the second inclined angle $\theta 2$ may be inclined at different angles. In these embodiments, the first straight line L1 may be a bent line that is bent at least once and is not a line that is disposed on only one plane.

The upper substrate 120 may be disposed on the lower substrate 110 to display an image on a front surface in accordance with an electrical signal applied to the display device. The front surface of the upper substrate 120 may include a display area DA and a peripheral area PA. A plurality of pixels may be formed in the display area DA such that an image may be displayed. The peripheral area PA may be disposed around the periphery of the display area DA. The peripheral area. PA may include various driving circuits and wires and no image may be displayed in the peripheral area. The peripheral area PA is also referred to as a bezel area.

In some exemplary embodiments, at least one surface of the lower substrate 110 may be provided with a display area DA and a peripheral area PA, and the upper substrate 120 may be a touch screen panel TSP that senses a touch from the outside of the display device. In this embodiment, the upper substrate 120 may include a touch area, which is an area in which a touch from the outside may be sensed. A touch bezel area may be disposed around the periphery of the touch area. A plurality of touch cells may be formed in the touch area. The touch cell is a unit capable of sensing an external touch. The touch cell may include at least one touch electrode. The touch cell may sense a touch from the outside in various ways such as a mutual capacitive type. The touch cell may output a touch output signal.

The first electrode 210 may be disposed between the lower substrate 110 and the upper substrate 120. In some embodiments, the first electrode 210 may be disposed on the lower substrate 110 of the display device. The first electrode 210 may include a plurality of signal lines and a plurality of pixels. The signal lines may electrically connect the pixels to the flexible printed circuit board 500 described later. Each pixel may display light for forming an image.

Figure 4:
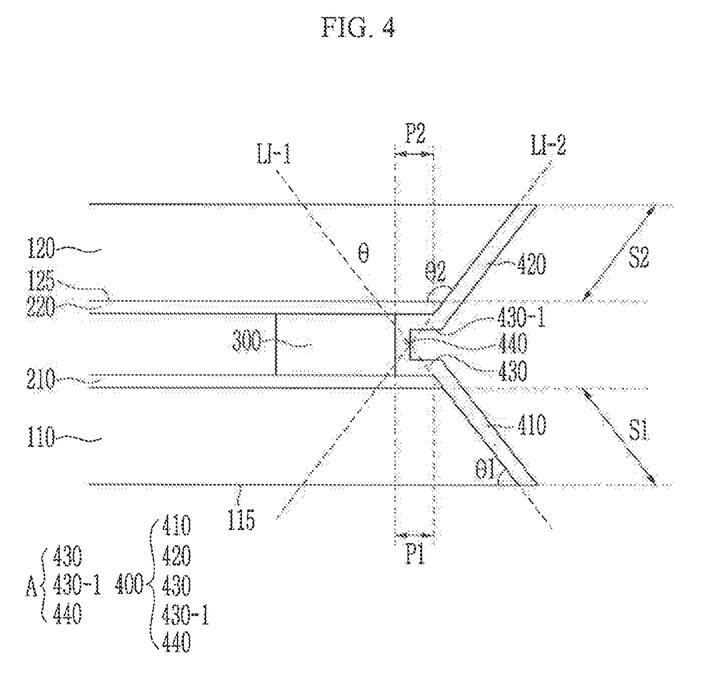
FIG. 4 illustrates a cross-sectional view of an exemplary embodiment of the present inventive concepts in which inclined angles of the upper and lower substrates are different from the embodiment in FIG. 2.
Figure 5:
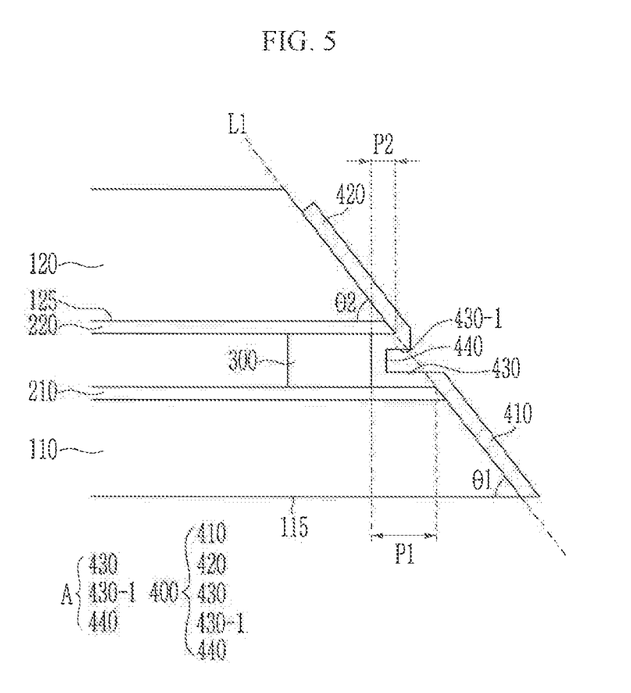
FIG. 5 illustrates a cross-sectional view of an embodiment in which a sealing portion is further recessed in a central portion of the substrate according to an exemplary embodiment of the present inventive concepts.

In some exemplary embodiments, the first electrode 210 may be disposed below the upper substrate 120, not above the lower substrate 110. As shown in FIGS. 4-5, a second electrode 220 may be disposed below the upper substrate 120.

The sealing portion 300 may be interposed between the lower substrate 110 and the upper substrate 120. The sealing portion 300 may attach the lower and upper substrates 110 and 120 together. The sealing portion 300 may be formed to expose a part of the first electrode 210 disposed on the lower substrate 110. In this embodiment, the surface in which the first electrode 210 is partially exposed is referred to as a first exposed surface P1. For example, in an exemplary embodiment, the sealing portion 300 may be disposed on an inner side of the first exposed surface to expose the first electrode 210. The first exposed surface P1 may be disposed adjacent to the first inclined surface S1 and extend from the first inclined surface S1.

The auxiliary electrode 400, may be a wire formed on the flexible printed circuit board 500. The auxiliary electrode 400 may be disposed along the first inclined surface S1 of the lower substrate 110 and the second inclined surface S2 of the upper substrate 120. As shown in FIG. 1, in an exemplary embodiment, the auxiliary electrode 400 may include a plurality of the auxiliary electrodes. The plurality of auxiliary electrodes 400 may be disposed to be spaced apart from each other by a predetermined distance. The auxiliary electrode 400 may include an electrically conductive metal, and may include a plurality of side wires electrically connected to the plurality of signal lines of the first electrode 210.

The auxiliary electrode 400 may include a first portion 410 contacting the first inclined surface S1 of the lower substrate 110, a second portion 420 contacting the second inclined surface S2 of the upper substrate 120, a third portion 430 contacting the first exposed surface P1 of the first electrode 210, and a fourth portion 440 contacting at least one side surface of the sealing portion 300. For example, in one embodiment, the fourth portion 440 contacts one side surface of the sealing portion 300. The third portion 430 and the fourth portion 440 are collectively referred to as a bent portion A. For example, as shown in FIG. 2, the side surface of the auxiliary electrode 400 may have a bent portion A that is bent out of the first straight line L1. In the exemplary embodiment shown in FIG. 2, the third portion 430 and the fourth portion 440 of the bent portion A are orientated substantially perpendicular with respect to each other.

Recently, research and development for minimizing the bezel area which no image of the display device is displayed, has been attracting attention. The bezel area may be reduced by a side bonding that bonds a driving circuit or wires to the side surface of the substrate. In the display device according to the exemplary embodiment of the present invention, circuit elements such as the flexible printed circuit board 500 on which the auxiliary electrode 400 may be formed or the printed circuit board (PCB) may be attached to the side surface of the substrate. However, since the side surface of the substrate is perpendicular to the lower surface of the substrate, when the circuit elements are attached to the side surface of the substrate, the bonding force may be weak.

Therefore, in the display device according to the exemplary embodiment of the present invention, the side surface of the substrate is inclined (e.g., in an oblique direction), thereby improving the adhesive force between the auxiliary electrode 400 that is side-bonded to the substrate and the circuit elements to achieve stable bonding therebetween. In addition, the electrode disposed on at least one surface of the substrate includes the exposed surface which increases the contact area between the auxiliary electrode 400 and the electrode, thereby stably applying the power or signal.

The side surface of the lower substrate 110 may have the first inclined surface S1. The side surface of the upper substrate 120 may have the second inclined surface S2. The side surfaces of the two substrates 110 and 120 collectively may form an oblique shape. Accordingly, the contact area of the auxiliary electrode 400 bonded to the side surfaces of the two substrates 110 and 120 increases and the bonding force between the two substrates 110 and 120 and the auxiliary electrode 400 may increase. Therefore, the auxiliary electrode 400 may be stably bonded to the side surfaces of the lower and upper substrates 110, 120.

In addition, the sealing portion 300 may be configured to expose the first exposed surface P1 of the first electrode 210 between the two substrates 110 and 120, The auxiliary electrode 400 may have the bent portion A. Accordingly, the auxiliary electrode 400 may contact not only the side surfaces of the first electrode 210 and the lower substrate 110, but also the first exposed surface P1. Since the contact area between the auxiliary electrode 400 and the first electrode 210 increases, a stable power or signal may be applied to the first electrode 210 through the auxiliary electrode 400. In an exemplary embodiment, a portion of the first portion 410 of the auxiliary electrode 400 may contact the side surface of the first electrode 210 in the side surface of the lower substrate 110. The third portion 430 of the bent portion A of the auxiliary electrode 400 may contact the first exposed surface P1.

The flexible printed circuit board 500 may include the auxiliary electrode 400, and the auxiliary electrode 400 may further include a wire connected to the driving circuit. The flexible printed circuit board 500 may be disposed on an outer side of the auxiliary electrode 400. For example, as shown in FIG. 2, the flexible printed circuit board 500 may be disposed above the auxiliary electrode 400. In an exemplary embodiment, the flexible printed circuit board 500 may directly contact the auxiliary electrode 400. Since the flexible printed circuit board 500 includes a plurality of signal lines, the flexible printed circuit board 500 may be electrically connected to the first electrode 210 disposed on the lower substrate 110 through the auxiliary electrode 400 contacting the flexible printed circuit board 500.

In some exemplary embodiments, the flexible printed circuit board 500 may be electrically connected to the first electrode 210 disposed below the upper substrate 120, and may be electrically connected to both the first electrode 210 disposed on the lower substrate 110 and the second electrode 220 disposed below the upper substrate 120. These embodiments will be described in more detail below.

The flexible printed circuit board 500 may be bent along the side surfaces of the two substrates 110 and 120 to extend to the lower surface 115 of the lower substrate 110, surrounding the two inclined surfaces S1 and S2. Although not shown, the flexible printed circuit board 500 may extend to an upper surface of the upper substrate 120. In addition to the flexible printed circuit board 500, a circuit element such as a printed circuit board (PCB) may be attached to the side surfaces of the two substrates 110 and 120.

As described above, the flexible printed circuit board 500 may be inclined along the two inclined surfaces S1 and S2 of the two substrates 110 and 120 on the auxiliary electrode 400. Therefore, the area where the flexible printed circuit board 500 contacts the two substrates 110 and 120 through the auxiliary electrode 400 increases. Accordingly, the flexible printed circuit board 500 may be stably bonded to the two substrates 110 and 120.

Figure 3:
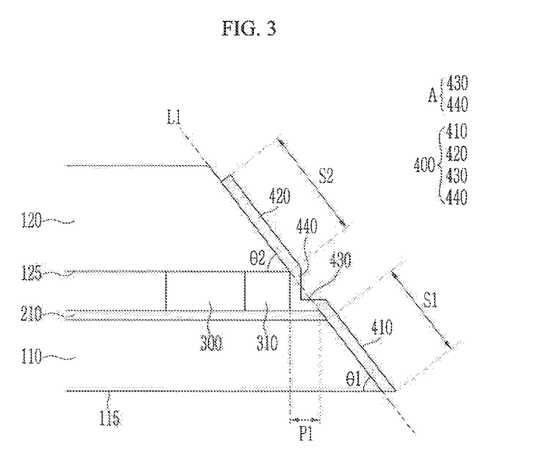
FIG. 3 illustrates a cross-sectional view of an embodiment which includes a filling portion according to an exemplary embodiment of the present inventive concepts.

Hereinafter, characteristics of the side surface of the display device according to exemplary embodiments will be described with reference to FIGS. 2-3. FIG. 2 and FIG. 3 are cross-sectional views taken along line I-I' of FIG. 1. FIG. 3 is a cross-sectional view of an exemplary embodiment in which a sealing portion of FIG. 2 is modified. A description of the substantially same elements as those described in FIG. 1 may be simplified or omitted. In the following cross-sectional views, an inclined surface and a contact surface are shown with arrows for convenience.

Referring to FIG. 2 together with FIG. 1, the upper substrate 120 may be disposed on the lower substrate 110, and the two substrates 110 and 120 may be bonded together through the sealing portion 300 interposed therebetween. In this embodiment, the lower substrate 110 and the upper substrate 120 may be respectively disposed to be inclined with respect to the lower surfaces 115, 125 of the substrates by the first inclined angle θ1 and the second inclined angle θ2. In exemplary embodiments, the first inclined angle θ1 and the second inclined angle θ2 may be the same or different. In the exemplary embodiment shown in FIG. 2, the first inclined angle θ1 and the second inclined angle θ2 are shown to be acute angles of smaller than 90 degrees. However, the first inclined angle θ1 and the second inclined angle θ2 may be obtuse angles or 90 degrees according to exemplary embodiments to be described later.

In the exemplary embodiment shown in FIG. 2, the first inclined angle θ1 and the second inclined angle θ2 may be the same, and side extension lines of the two inclined surfaces S1 and S2 of the two substrates 110 and 120 may be disposed on the same line of the first straight line L1.

The first electrode 210 may be disposed on the lower substrate 110. The first electrode 210 may include a plurality of signal lines for applying a driving voltage, a data signal, and the like to the display device, an insulating layer, and a plurality of pixels that emit light to display an image. The signal lines may include a gate line for transmitting a gate signal, a data line for transmitting a data signal, a power supply line for transmitting a driving voltage, and a reference voltage terminal.

The sealing portion 300 may be disposed between the two substrates 110 and 120 to physically couple the two substrates. The sealing portion 300 may be configured to expose a part of the first electrode 210 disposed on the lower substrate 110, thereby increasing the contact area of the auxiliary electrode 400 with the first electrode 210 through the bent portion A.

The auxiliary electrode 400 may be bonded to the side surfaces of the two substrates 110 and 120 along the two inclined surfaces S1 and S2. The auxiliary electrode 400 may include a plurality of signal lines. In this embodiment, the bent portion A including the third portion 430 and the fourth portion 440 is disposed so as to deviate from the first straight line L1, and thus, is not disposed on the same line as the first portion 410 and the second portion 420. Although not shown, the auxiliary electrode 400 may pass the first inclined surface S1 of the lower substrate 110 and extend to the lower surface 115 of the lower substrate 110. In this embodiment, the third portion 430 and the fourth portion 440 may have a structure that is bent at different angles front the first portion 410 and the second portion 420. The bent portion A including the third portion 430 and the fourth portion 440 may have various different structures.

The flexible printed circuit hoard 500 may include the auxiliary electrode 400, and the auxiliary electrode 400 may further include the wire connected to the driving circuit. The flexible printed circuit board 500 may be in direct contact with the auxiliary electrode 400 at an outer side of the auxiliary electrode 400 (e.g., above the auxiliary electrode 400). Since the flexible printed circuit board 500 includes the plurality of signal lines, the flexible printed circuit board 500 may be electrically connected to the first electrode 210 disposed on the lower substrate 110 through the auxiliary electrode 400.

The auxiliary electrode 400 may be disposed on side surfaces of the two substrates 110 and 120 along the first sloped surface S1 and the second sloped surface S2 on the auxiliary electrode 400. The flexible printed circuit board 500 may pass the first inclined surface S1 of the lower substrate 110 and extend to the lower surface thereof to be bent to surround the lower substrate 110. In an exemplary embodiment in which the first inclined angle θ1 is an acute angle, the flexible printed circuit board 500 may be bent at an acute angle with respect to the first inclined surface S1 of the lower substrate 110.

Hereinafter, an embodiment to which a filling portion is added will be described with reference to FIG. 3. A description of the same contents as those described in FIG. 2 will be omitted, and features that are different from the above-described embodiment will be mainly described.

The sealing portion 300 may be disposed between the lower substrate 110 and the upper substrate 120 to physically couple the two substrates. In this embodiment, the display device according to the embodiment may further include a filling portion 310 that is disposed adjacent to the sealing portion 300. The filling portion 310 may be disposed outside of the sealing portion 300.

Unlike the sealing portion 300, the filling portion 310 may be configured to be filled from the outside after the two substrates 110 and 120 are bonded together. The filling portion 310 may include a different material from the sealing portion 300.

Figure 6:
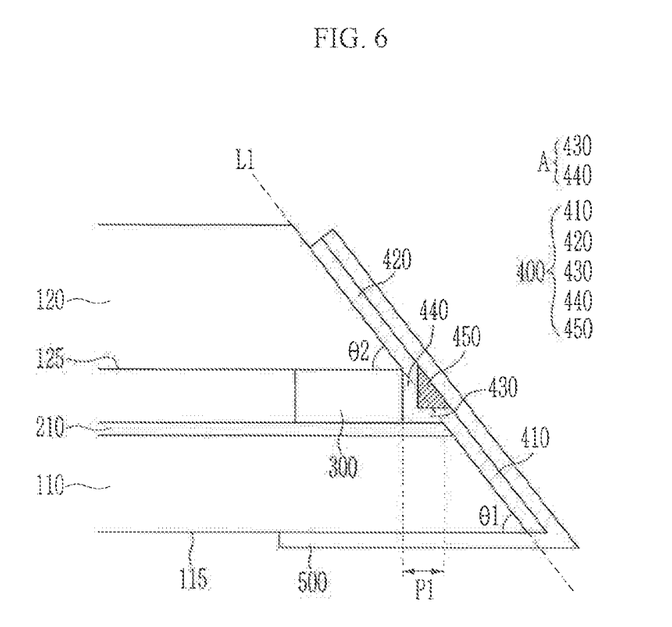
FIG. 6 illustrates a cross-sectional view of an embodiment which includes a filling portion of an auxiliary electrode according to an exemplary embodiment of the present inventive concepts.

Hereinafter, a display device according to other exemplary embodiments will be described with reference to FIG. 4 to FIG. 6. FIG. 4 illustrates a cross-sectional view of an exemplary embodiment in which the inclined angles of the upper and lower substrates are different from the embodiment in FIG. 2. FIG. 5 illustrates a cross-sectional view of an exemplary embodiment in which the sealing portion 300 is further recessed to the inside of the substrate. FIG. 6 illustrates a cross-sectional view of an exemplary embodiment which includes a filling portion 450 of the auxiliary electrode 400. A description of the same or similar elements as those described above may be simplified or omitted. Features that are different from the embodiments described above will be mainly described.

Referring to FIG. 4, a display device according to an exemplary embodiment may include the upper substrate 120, the lower substrate 110, the first electrode 210, the second electrode 220, the sealing portion 300, the auxiliary electrode 400, and the flexible printed circuit board 500.

The side surface of the lower substrate 110 may include the first inclined surface S1 which is inclined with respect to the lower surface 115 of the lower substrate 110 by the first inclined angle θ1. The first electrode 210 may be disposed on the lower substrate 110.

The upper substrate 120 may be disposed on the lower substrate 110. The side surface of the upper substrate 120 may include the second inclined surface S2 which is inclined with respect to the lower surface 125 of the upper substrate 120 by the second inclined angle θ2. Unlike the exemplary embodiments shown in FIGS. 1-3, the second inclined angle θ2 may be inclined to have an obtuse angle of greater than 90 degrees. The first inclined surface S1 may be disposed on a straight line L1-1 and the second inclined surface S2 may be disposed on a straight line L1-2. An angle between the straight line L1-1 and the straight line L1-2 may be equal to a difference between the first inclined angle θ1 and the second inclined angle θ2. Therefore, the two inclined surfaces S1 and S2 may not be disposed on the same line. The first inclined surface S1 and the second inclined surface S2 may be vertically symmetrical.

The second electrode 220 may be disposed under the upper substrate 120. The second electrode 220 may include a plurality of signal lines and a plurality of pixels in the same manner as the first electrode 210. The signal lines may electrically connect the pixels to the auxiliary electrode 400 described later. Each pixel may display light for forming an image. In some exemplary embodiments, the second electrode 220 may be a touch electrode, unlike the first electrode 210. The display device may include a touch sensing function capable of interacting with a user in addition to a function of displaying an image. The touch sensing function may be implemented through a touch sensor formed on the display panel. In the exemplary embodiment shown in FIG. 4, the second electrode 220 may be a touch electrode serving as the touch sensor.

As such, in FIG. 4, the electrodes including the signal lines are disposed on both the lower substrate 110 and the upper substrate 120, and the first inclined surface S1 is inclined to form an acute angle, while the second inclined surface S2 is inclined to form an obtuse angle.

The sealing portion 300 may be formed to expose the first exposed surface P1 that is a part of the first electrode 210 disposed on the lower substrate 110. Further, the sealing portion 300 is formed to expose a part of the second electrode 220 disposed under the upper substrate 120. In this embodiment, the surface in which the second electrode 220 is partially exposed is referred to as the second exposed surface P2. The sealing portion 300 may be disposed on an inner side of the second exposed surface P2, and may be disposed to expose a part of the second electrode. The second exposed surface P2 may be disposed adjacent to the second inclined surface S2 and extending to the second inclined surface S2.

As described above, since the sealing portion 300 is configured to expose the first electrode 210 through the first exposed surface P1 and to expose the second electrode 220 through the second exposed surface P2, the contact area with the auxiliary electrode 400 described later may be further increased.

The auxiliary electrode 400 may be bonded to the side surfaces of the two substrates 110 and 120 along the two inclined surfaces S1 and S2. The auxiliary electrode 400 may include a plurality of signal lines.

The auxiliary electrode 400 may include the first portion 410, the second portion 420, the third portion 430, and the fourth portion 440, and further includes an fifth portion 430-1 in the above-described embodiment. The first portion 410 may be in contact with the first inclined surface S1. The second portion 420 may be in contact with the second inclined surface S2. The third portion 430 may be in contact with the first exposed surface P1. The fourth portion 440 may be in contact with a side surface of the sealing portion 300. The fifth portion 430-1 may be in contact with the second exposed surface P2 of the second electrode 220.

In this embodiment, the third portion 430, the fifth portion 430-1, and the fourth portion 440 may be referred to as the bent portion A. Unlike the above-described embodiments, the bent portion A may have a substantially "C" shape as the two inclined angles θ1 and θ2 of the two inclined surfaces S1 and S2 are formed to be different. The bent portion A may be disposed to deviate from both a first-one straight line L1-1 and a first-two straight line L1-2. The bent portion A may not be disposed on the same line as the first portion 410 and the second portion 420. The third portion 430, the fifth portion 430-1, and the fourth portion 440 may have a bent structure at an angle that is different from that of the first portion 410 and the second portion 420. The bent portion A including the third portion 430, the fifth portion 430-1, and the fourth portion 440 may have various structures.

Although not shown, the auxiliary electrode 400 may pass the first inclined surface S1 of the lower substrate 110 and extend to the lower surface 115 of the lower substrate 110.

The same signal may be applied to the first electrode 210 and the second electrode 220. In some exemplary embodiments, when the first electrode 210 includes common signal lines and the second electrode 220 is a touch electrode, the auxiliary electrodes 400 may be separately formed so that another signal array be applied thereto.

As described above, since the side surfaces of the two substrates 110 and 120 are formed to be inclined, the contact area between the two substrates 110 and 120 and the auxiliary electrode 400 increases, thus the bonding force therebetween increases, so that they may be stably bonded. In addition, not only is the third portion 430 of the auxiliary electrode 400 in contact with the first exposed surface P1 of the first electrode 210, but the second inclined angle θ2 has an obtuse angle, so that the fifth portion 430-1 may be in contact with the second exposed surface P2. Accordingly, the areas in which the auxiliary electrode 400 contacts the first electrode 210 and the second electrode 220 are all increased, so that the power, signal, touch signal, or the like may be stably applied to the display device.

Referring to FIG. 5, both the first inclined surface S1 and the second inclined surface S2 may be inclined to have an acute angle as in the embodiment of FIG. 2. In this embodiment, the first inclined angle θ1 and the second inclined angle θ2 may be the same as or different from each other. As shown in FIG. 4, the second electrode 220 may be disposed under the upper substrate 120. The second electrode 220 may include the same general signal lines as the first electrode 210, or unlike the first electrode 210, may be a touch electrode serving as a touch sensor.

Unlike the embodiment of FIG. 2, the sealing portion 300 may be positioned in a direction away from the two inclined surfaces S1 and S2 (e.g., towards a central portion of the substrate). Accordingly, the auxiliary electrode 400 may include the fifth portion 430-1 in contact with the second exposed surface P2 as well as the third portion 430 in contact with the first exposed surface P1. The third portion 430, the fifth portion 430-1, and the fourth portion 440 of the auxiliary electrode 400 form the bent portion A, which may have a general "C" shape in which an upper side thereof is shorter than a lower side thereof. The third portion 430, the fifth portion 430-1, and the fourth portion 440 may have a bent structure at an angle that is different from that of the first portion 410 and the second portion 420. However, the bent portion A including the third portion 430, the fifth portion 430-1, and the fourth portion 440 may have various structures in accordance with exemplary embodiments of the present inventive concepts.

As described above, since the side surfaces of the two substrates 110 and 120 are formed to be inclined, the contact area between the two substrates 110 and 120 and the auxiliary electrode 400 increases. Therefore, the bonding force between the upper and lower substrates 110, 120 and the auxiliary electrode 400 increases so that they may be stably bonded. In addition, not only may the third portion 430 of the auxiliary electrode 400 be in contact with the first exposed surface P1 of the first electrode 210, but the fifth portion 430-1 may also be in contact with the second exposed surface P2 due to the positioning of the sealing portion 300. Accordingly, the areas in which the auxiliary electrode 400 contacts the first electrode 210 and the second electrode 220 are all increased, so that the power, signal, touch signal, or the like may be stably applied to the display device.

Referring to FIG. 6, both the first inclined surface and the second inclined surface S2 may be inclined to have an acute angle as in the exemplary embodiment of FIG. 2. In this embodiment, the first inclined angle θ1 and the second inclined angle θ2 may be the same as or different from each other.

The auxiliary electrode 400 includes the first portion 410, the second portion 420, the third portion 430, the fourth portion 440, and the filling portion 450. The filling portion 450 includes the same material as the first portion 410, the second portion 420, the third portion 430, and the fourth portion 440, and may be a part of the auxiliary electrode 400. In some exemplary embodiments, the filling portion 450 may include a different material from those of the first, second, third, and fourth portions 410, 420, 430, and 440.

The auxiliary electrode 400 may include the bent portion A that deviates from the first straight line L1, as shown in FIG. 1. The bent portion A may include the third portion 430 in contact with the first exposed surface P1 and the fourth portion 440 in contact with one side surface of the sealing portion 300. In the exemplary embodiment shown in FIG. 6, the auxiliary electrode 400 may further include the filling portion 450 that is disposed above the bent portion A to fill the bent portion A. Since the auxiliary electrode 400 further includes the filling portion 450, the side surface of the auxiliary electrode 400 may be substantially disposed on the same line as the first straight line L1.

By forming the auxiliary electrode 400, which is disposed on the same plane as the flexible printed circuit board 500 without bending, on the flexible printed circuit board 500, the flexible printed circuit board 500 may further stably be in close contact with the two substrates 110 and 120 through the auxiliary electrode 400, thereby improving reliability.

Figure 7:
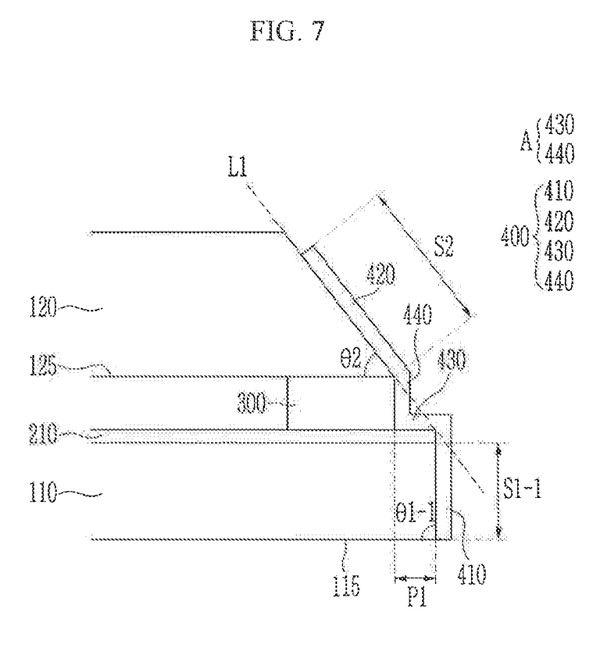
FIG. 7 illustrates a cross-sectional view of an embodiment in which an upper substrate is provided with an inclined side surface and an electrode is disposed on a lower substrate according to an exemplary embodiment of the present inventive concepts.
Figure 8:
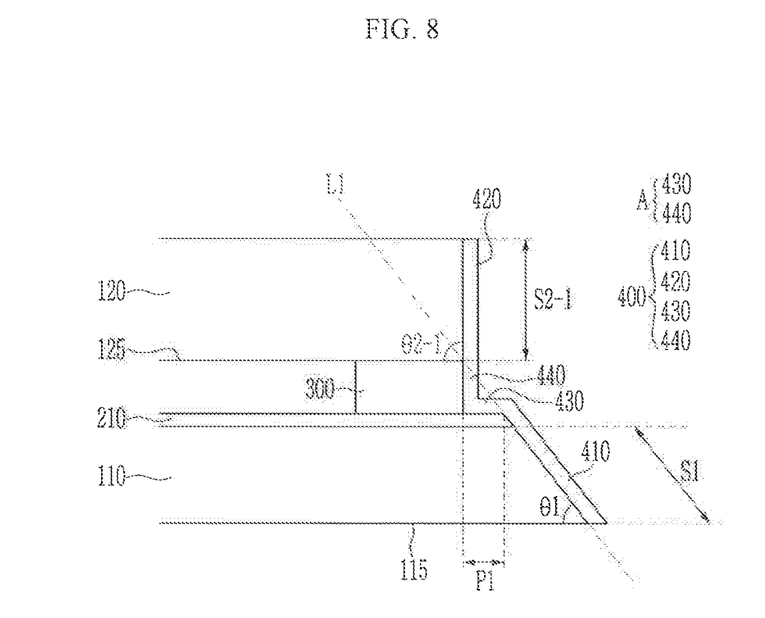
FIG. 8 illustrates a cross-sectional view of an embodiment in which a lower substrate is provided with an inclined side surface and an electrode is disposed on the lower substrate according to an exemplary embodiment of the present inventive concepts.
Figure 9:
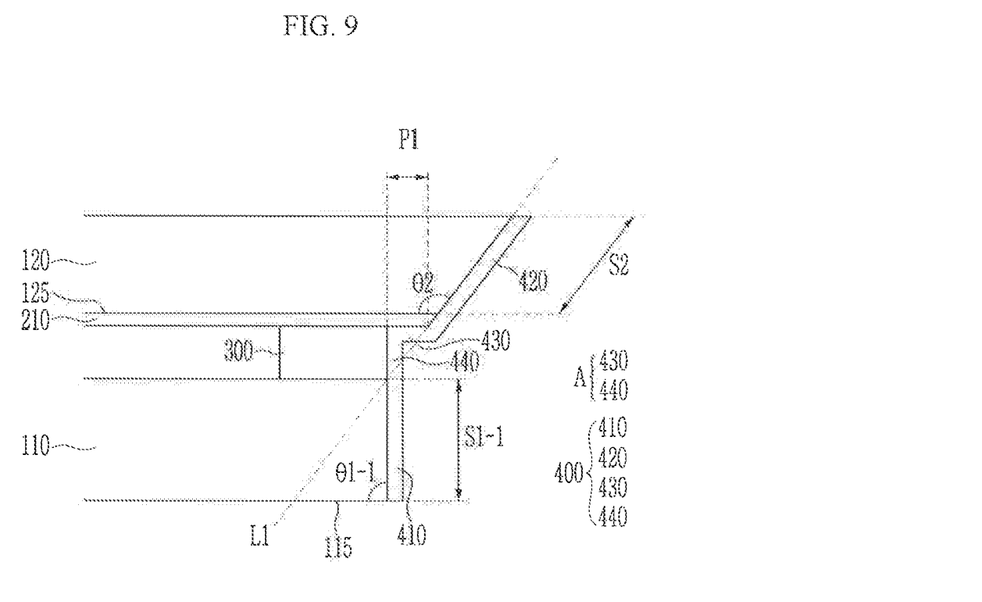
FIG. 9 illustrates a cross-sectional view of an embodiment in which an upper substrate is provided with an inclined side surface and an electrode is disposed on the upper substrate according to an exemplary embodiment of the present inventive concepts.

Hereinafter, display devices according to other exemplary embodiments will be described with reference to FIGS. 7-9. FIG. 7 illustrates a cross-sectional view of an exemplary embodiment in which an upper substrate is provided with an inclined side surface and a wire is disposed on a lower substrate. FIG. 8 illustrates a cross-sectional view of an exemplary embodiment in which a lower substrate is provided with an inclined side surface and a wire is disposed on the lower substrate. FIG. 9 illustrates a cross-sectional view of an exemplary embodiment in which an upper substrate is provided with an inclined side surface and a wire is disposed on the upper substrate. Hereinafter, features that are different from the exemplary embodiments described above will be mainly described.

Referring to FIG. 7, a first side surface S1-1, which is one side surface of the lower substrate 110, may not form an inclined angle. For example, the first angle θ1-1 may be approximately 90 degrees. The side surface of the upper substrate 120 may include the second inclined surface S2 inclined at the second inclined angle θ2. The second inclined angle θ2 may be an acute angle. The first electrode 210 may be disposed on the lower substrate 110. The sealing portion 300 may be disposed between the lower substrate 110 and the upper substrate 120 to expose the first exposed surface P1 of the first electrode 210. The first exposed surface P1 may extend to the first side surface S1-1.

The auxiliary electrode 400 may include the first portion 410 contacting the first side surface S1-1 of the lower substrate 110 the second portion 420 contacting the second inclined surface S2 of the upper substrate 120, the third portion 430 contacting the first exposed surface P1 of the first electrode 210, and the fourth portion 440 contacting a side surface of the sealing portion 300. Here, the third portion 430 and the fourth portion 440 form the bent portion A of the auxiliary electrode 400. The bent portion A is disposed outside of the first straight line L1 extending from the side surface of the second inclined surface S2.

The flexible printed circuit board 500 may be disposed on the auxiliary electrode 400, and a plurality of signal lines may be formed on the auxiliary electrode 400 on the flexible printed circuit board 500.

Referring to FIG. 8, the side surface of the lower substrate 110 may include the first inclined surface S1, which forms the first inclined angle θ1. The first inclined angle θ1 may be an acute angle. The second side surface S2-1, which is a side surface of the upper substrate 120, may not include an inclined angle. For example, the second angle θ2-1 may be approximately 90 degrees. The first electrode 210 may be disposed on the lower substrate 110. The sealing portion 300 may be disposed between the lower substrate 110 and the upper substrate 120 and is configured to expose the first exposed surface P1 of the first electrode 210. The first exposed surface P1 may extend to the first inclined surface S1.

The auxiliary electrode 400 may include the first portion 410 contacting the first inclined surface S1 of the lower substrate 110, the second portion 420 contacting the second side surface S2-1 of the upper substrate 120, the third portion 430 contacting the first exposed surface P1 of the first electrode 210, and the fourth portion 440 contacting the one side surface of the sealing portion 300. Here, the third portion 430 and the fourth portion 440 form the bent portion A of the auxiliary electrode 400. The bent portion A may be disposed outside of the first straight line L1 extending from the side surface of the first inclined surface S1.

The flexible printed circuit board 500 may be disposed on the auxiliary electrode 400, and a plurality of signal lines may be formed on the auxiliary electrode 400 on the flexible printed circuit hoard 500.

Referring to FIG. 9, the first side surface S1-1, which is one side surface of the lower substrate 110, may not form an inclined angle. For example, the first angle θ1-1 may be approximately 90 degrees. The side surface of the upper substrate 120 may include the second inclined surface S2 inclined at the second inclined angle θ2. The second inclined angle θ2 may be an obtuse angle. The first electrode 210 may be disposed on the upper substrate 120. The sealing portion 300 may be disposed between the lower substrate 110 and the upper substrate 120 and may be configured to expose the first exposed surface P1 of the first electrode 210. The first exposed surface P1 may extend to the second inclined surface S2.

The auxiliary electrode 400 may include the first portion 410 contacting the first side surface S1-1 of the lower substrate 110, the second portion 420 contacting the second inclined surface S2 of the upper substrate 120, the third portion 430 contacting the first exposed surface P1 of the first electrode 210, and the fourth portion 440 contacting a side surface of the sealing portion 300. In this embodiment, the third portion 430 and the fourth portion 440 form the bent portion A of the auxiliary electrode 400. The bent portion A may be disposed outside the first straight line L1 extending from the side surface of the second inclined surface S2.

The flexible printed circuit board 500 may be disposed on the auxiliary electrode 400, and a plurality of signal lines may be formed on the auxiliary electrode 400 on the flexible printed circuit board 500.

According to the above-described exemplary embodiments, a side surface of at least one of the upper substrate 120 or the lower substrate 110 may include an inclined surface, thereby increasing the contact area between the substrate and the auxiliary electrode 400. Accordingly, the bonding force between them increases, so that they may be stably bonded even if the bonding is to the side surface of the substrate.

In addition, the sealing portion 300 may be disposed to expose the first exposed surface P1 of the first electrode 210 so that the bent portion A of the auxiliary electrode 400 may contact the first exposed surface P1. Therefore, the contact area of the auxiliary electrode 400 and the first electrode 210 may be increased. Accordingly, power, a signal, or the like may be stably applied to the display device through the auxiliary electrode 400.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A display device comprising:
   a lower substrate that includes a side surface having a first inclined surface;
   an upper substrate disposed on the lower substrate, the upper substrate including a side surface having a second inclined surface;
   a first electrode disposed on a surface of at least one of the lower substrate or the upper substrate; and
   an auxiliary electrode disposed on the first inclined surface of the lower substrate and the second inclined surface of the upper substrate,
   wherein the auxiliary electrode includes a first portion corresponding to the first inclined surface, a second portion corresponding to the second inclined surface, and a bent portion that is bent at a predetermined angle with respect to the first and second inclined surfaces, and
   the first electrode is in contact with the bent portion of the auxiliary electrode on a first exposed surface of the first electrode to electrically connect the first electrode to the auxiliary electrode.

2. The display device of claim 1, further comprising a sealing portion interposed between the lower substrate and the upper substrate,
   wherein the sealing portion is disposed on an inner side of the first exposed surface to expose the first electrode.

3. The display device of claim 2, wherein the bent portion includes a third portion corresponding to the first electrode on the first exposed surface and a fourth portion corresponding to a side surface of the sealing portion.

4. The display device of claim 3, wherein the first electrode is disposed on the lower substrate, the first inclined surface is inclined at an acute angle with respect to a lower surface of the lower substrate, and the first exposed surface is adjacent to the first inclined surface.

5. The display device of claim 4, further comprising a flexible printed circuit board (FPC) disposed on the auxiliary electrode.

6. The display device of claim 5, wherein the flexible printed circuit board (FPC) is configured to pass the first inclined surface and extend to the lower surface of the lower substrate.

7. The display device of claim 4, wherein the auxiliary electrode further includes a filling portion that is configured to receive a material for filling the bent portion.

8. The display device of claim 7, further comprising a flexible printed circuit board (FPC) disposed on the auxiliary electrode,
   wherein the filling portion is disposed between the bent portion and the flexible printed circuit board (FPC), and the flexible printed circuit board (FPC) is in contact with the first portion, the second portion, and the filling portion of the auxiliary electrode.

* * * * *